United States Patent [19]

Ratkiewich

[11] Patent Number: 5,060,383
[45] Date of Patent: Oct. 29, 1991

[54] VEGETATION CUTTER

[76] Inventor: Richard H. Ratkiewich, 90 Clark Hill Rd., Prospect, Conn. 06712

[21] Appl. No.: 563,511

[22] Filed: Aug. 6, 1990

[51] Int. Cl.$^5$ .............................................. B26B 7/00
[52] U.S. Cl. ........................................ 30/276; 30/347
[58] Field of Search ................. 30/276, 347, 390, 391, 30/DIG. 5, 263–265

[56] References Cited

U.S. PATENT DOCUMENTS

| | | | |
|---|---|---|---|
| 3,877,146 | 4/1975 | Pittinger | 30/276 |
| 4,864,728 | 9/1989 | Kloft et al. | 30/276 |
| 4,890,389 | 1/1990 | Whitkop | 30/276 |
| 4,987,681 | 1/1991 | Sepke | 30/276 |

Primary Examiner—Douglas D. Watts
Attorney, Agent, or Firm—Dallett Hoopes

[57] ABSTRACT

A vegetation cutter has a power unit and a rotating cutting device defining a planar cutting circle. In a hand-held cutter the circle is disposed about an axis at an obtuse angle with respect to the structure held. In a non-hand-held unit the axis is not dependent on any relationship to the structure. For either of these categories, a guard is provided having a narrow elongate arcuate shape, the arc centered on the axis with radius substantially the same as the planar cutting circle and normally disposed below the planar cutting circle and in front of the cutting circle with respect to the forward movement of the cutter and the operator thereof. The guard has sufficient length to operatively support and guide the cutting device when the cutter is turned and operated with the planar cutting circle in vertical disposition as in edging. A mounting assembly is secured to both the structure and the guard and permits the guard to be pivotted from normal operative position to standby position.

21 Claims, 3 Drawing Sheets

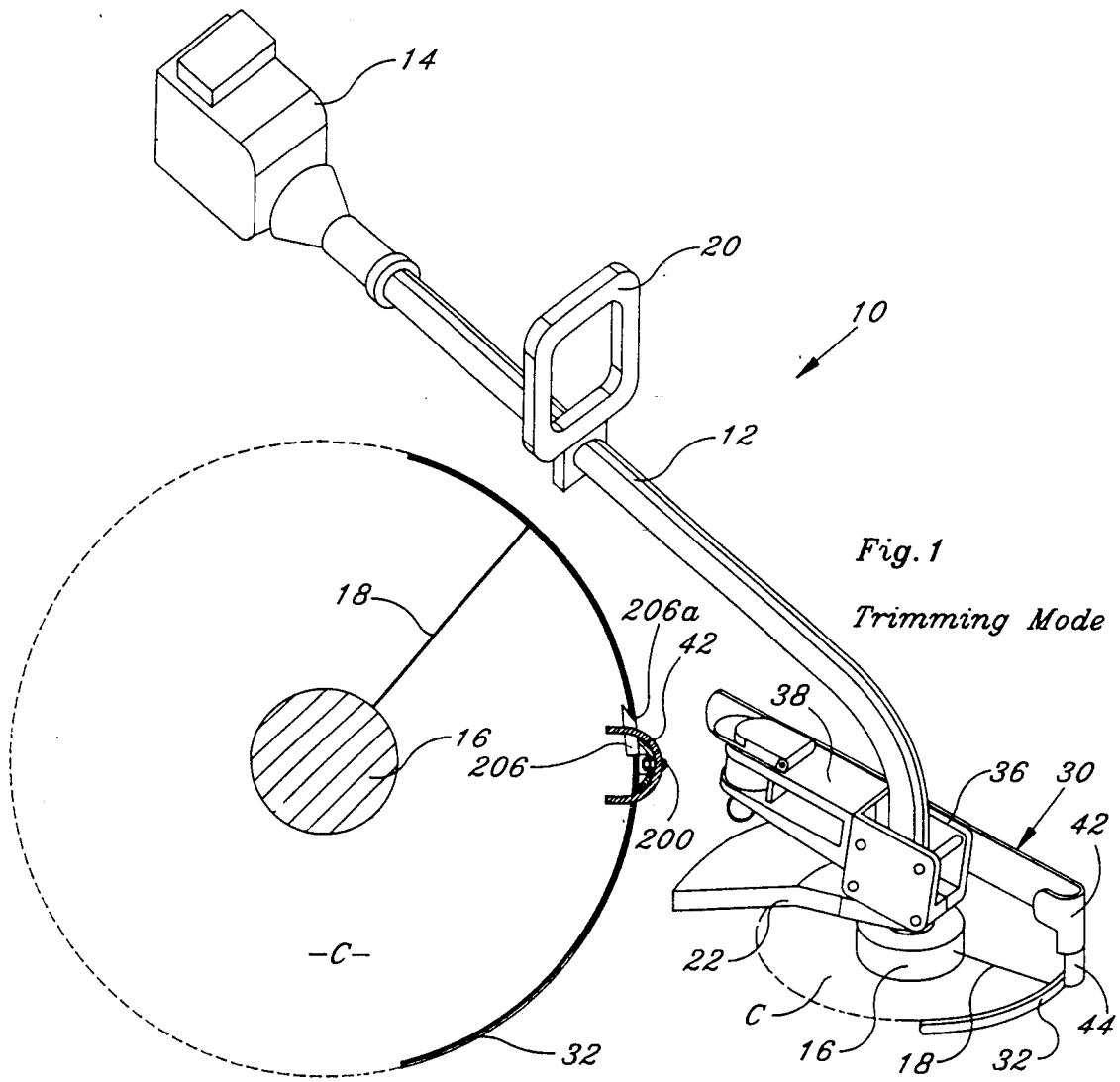
*Fig. 1*
*Trimming Mode*
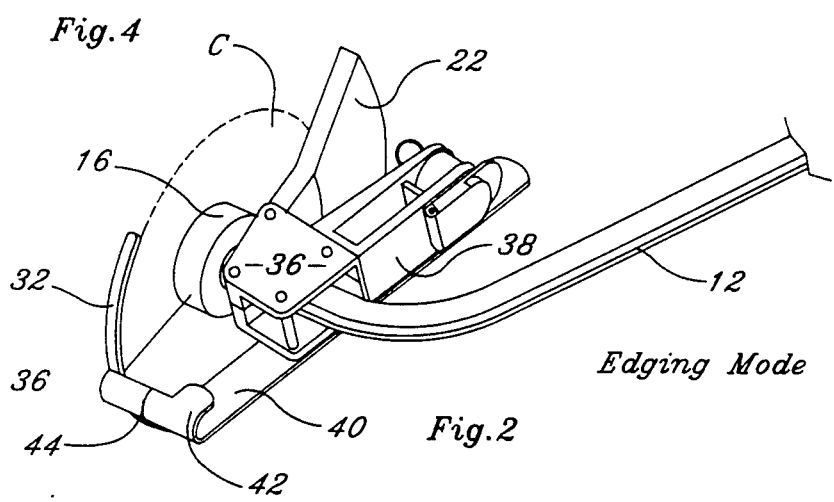
*Fig. 4*
*Fig. 2*
*Edging Mode*

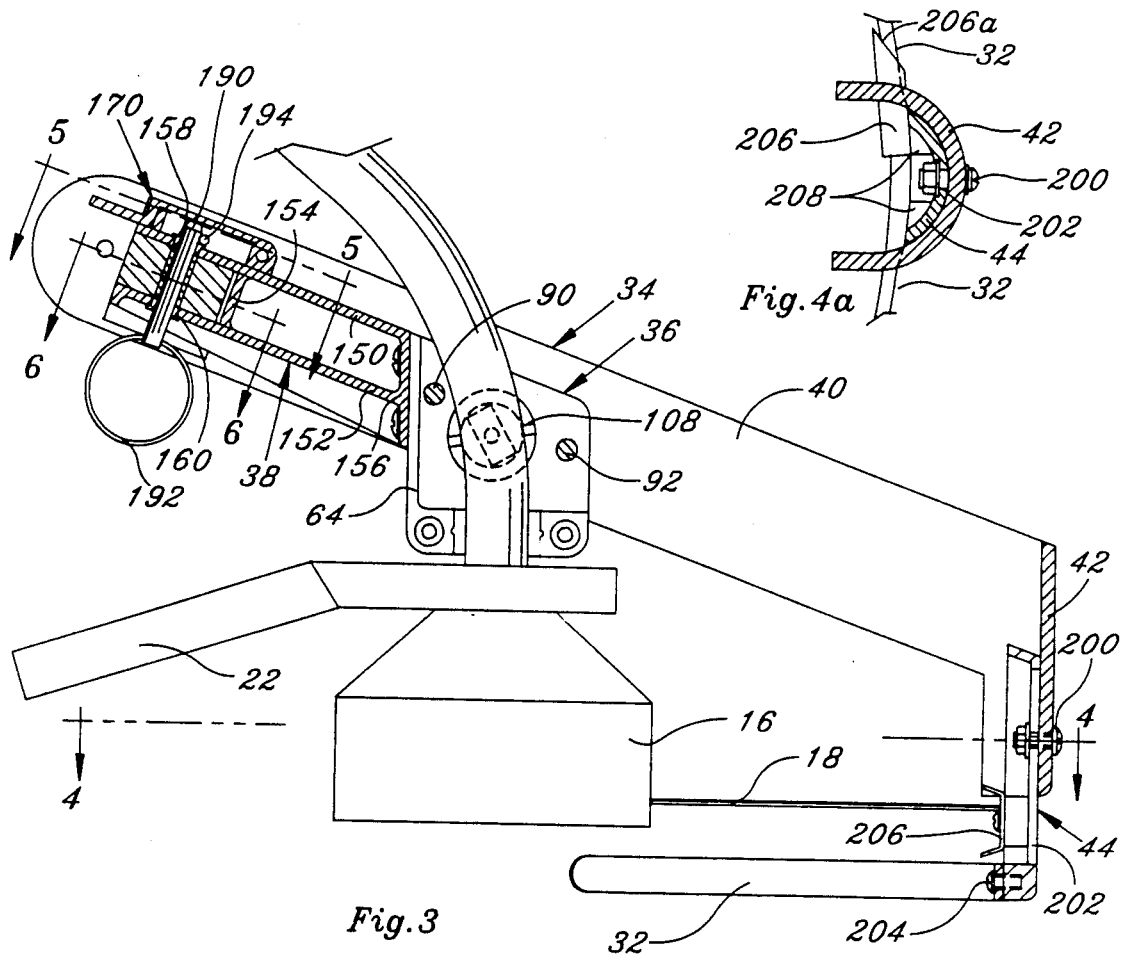
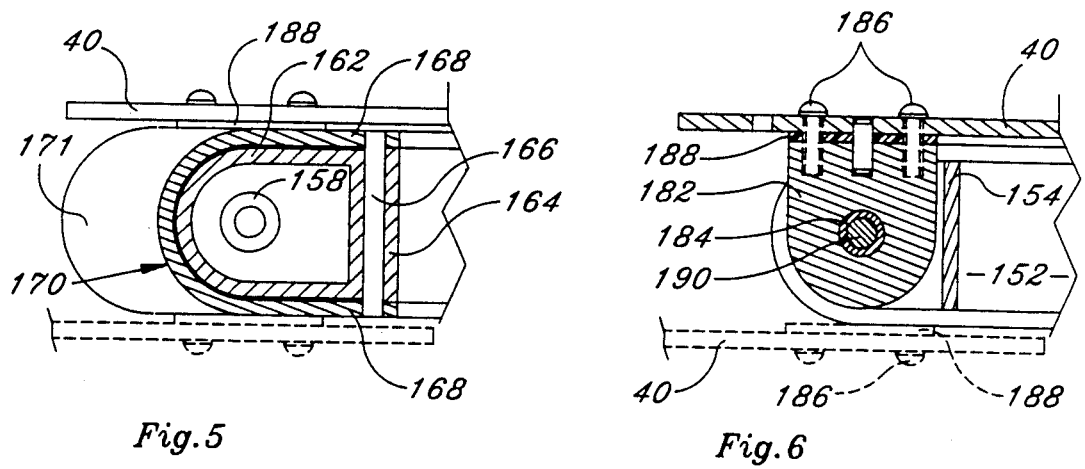

5,060,383

VEGETATION CUTTER

BACKGROUND OF THE INVENTION

1. Field of the Invention

This invention relates to a vegetation cutter provided with a guard. More specifically, the cutter has in one example a line element as its cutting device. The cutter has an arcuate guard which can serve to protect objects close to the area of trimming and can serve as a support and guide when the cutter is used in its edging mode.

It is envisioned that the invention applies to vegetation cutters of all types having a rotary cutting element including, but not limited to, line, flail-blade and disc-type cutters.

2. Description of Related Art including Information Disclosed under §§1.97 to 1.99

The prior art is replete with examples of vegetation cutters having rotating cutting devices defining a planar cutting circle. A popular form of such cutters is a line trimmer so named because it comprises a power-rotated head having a short length of line swinging outward therefrom, the mass and speed of the line being able after repeated bludgeoning to sever the tops off grass and weeds.

Careful operators of line trimmers as they have been marketed in the past have been aware that plants and trees around which trimming must be done can be severely injured by the line if the whirling head is permitted to come too close. Young fruit trees, for instance, can be stripped of their bark by careless trimming with a line trimmer and can thereby be severely stunted or even killed.

Attempts have been made in the past to provide a guard assuring the spacing of the trimmer from the nearby trees and the like. An example is shown in U.S. Pat. No. 4,756,084 which issued July 12, 1988 to Morita. The Morita device has a wide curving plate on the end of an arm so that the guard contacts objects to be protected and prevents the line from striking them. The guard portion of Morita's device can be used to keep a tree trunk a fixed distance away from the rotating head.

A further U.S. Pat. No. 4,890,389 to G.H. Whitkop issued Jan. 2, 1990 provides a ring-like guard about the line trimmer, the ring having an opening in the front of the line cutter to permit passage of the grass to be cut and, at the same time, guarding trees and the like which are disposed to the side of the front of the trimmer.

SUMMARY OF THE PRESENT INVENTION

The present invention, broadly speaking, comprises a vegetation cutter featuring a rotating cutter element having an arcuate guard substantially coincident with the sweep of the outer tip of the cutter element. The guard is in the front of and slightly below the cutter element. By means of this arrangement, the cutter may be moved forwardly toward a solid object and the guard will keep the cutter element spaced from the object. At the same time, the structure of the cutter of the invention makes it possible to tip the cutter on its side — so that the planar cutting circle defined by the rotating element is vertical— and rest the front end of the cutter on the arcuate guard adjacent vegetation to be vertically cut as the cutter is moved along.

The invention, more narrowly, in one of its forms comprises a line trimmer, having a guard and guide defined by an elongate arcuate shape of minimal height, the arc centered on the axis of the trimmer and disposed in the front of the trimmer and extending about 150° with respect to the cutting circle. The guard is useful to keep the whirling trimming line spaced from objects to be trimmed to avoid damage and useful as a support and guide when the trimmer is tipped 90° during the edging process. In a preferred form, the guard is mounted to be shifted to a standby position, The mounting for the guard accommodates the different shapes of cutter shafts.

BRIEF DESCRIPTION OF THE DRAWINGS

Other features and objects of the invention will be apparent from the following specification and drawings, all of which disclose a non-limiting form of the invention. In the drawings:

FIG. 1 is a perspective view of a vegetation cutter embodying the invention and used in the trimming mode;

FIG. 2 is a fragmentary perspective view from the opposite side with respect to FIG. 1 and showing the cutter tipped so that the trimmer end is supported on the guard as in edging;

FIG. 3 is an enlarged view of the front end of a cutter showing the mounting partly in section and the guard in its normal position;

FIG. 4 is a reduced sectional view taken on the line 4—4 of FIG. 3 and showing the head as a solid block for simplicity;

FIG. 4a is an enlarged fragment of FIG. 4;

FIG. 5 is an enlarged fragmentary view taken on the line 5—5 of FIG. 3;

FIG. 6 is an enlarged fragmentary sectional view taken on the line 5—5 of FIG. 3;

DESCRIPTION OF THE PREFERRED EMBODIMENT

Figure 7:
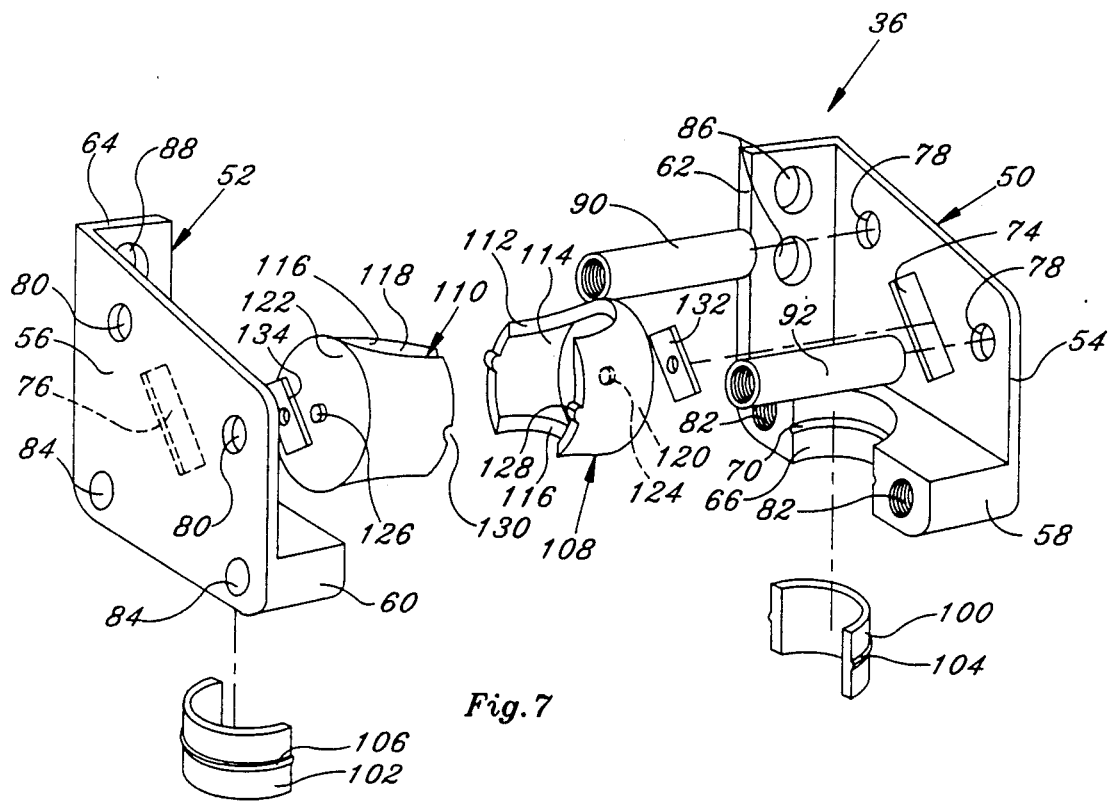
FIG. 7 is an exploded perspective view showing the mounting for the guard.

A vegetation cutter as shown in FIG. 1 is hand held and generally designated 10. It comprises a shaft 12 enclosing a drive transmission element (not shown) on the rear end of which is a power unit 14 which may be controlled by a hand throttle (not shown). The forward end of the shaft 12 carries a cutting head 16 which rotates at a speed dependent on the speed of the power unit 14.

A line 18 swings out from the head 16 and in swinging defines a planar cutting circle C (FIGS. 1, 4). Intermediate the power unit 14 and the head 16 a handle 20 is mounted on the shaft 12. A pie-sliced shape apron 22 is mounted on the shaft above the head 16. It serves to protect the operator's feet from the line and to support the cutter in storage.

In the embodiment of cutter shown the guard of the invention is an attachment to the shaft 12 and is generally designated 30 (FIG. 2). It comprises an arcuate elongated guard element 32 having its arc centered on the axis of the head 16. As shown in FIG. 3, the guard is on the perimeter of the planar cutting circle and preferably disposed somewhat lower than the line 18. Preferably the guard 32 extends through an arc of about 150°, the center of the arc being squarely in front of the cutter (FIG. 4). The guard is preferably no greater than ¼ in thickness and ½ high. It may be tubular in section. However, the rectangular section as shown permits closer trimming to adjacent objects. The ends of the guard are rounded as shown.

The mounting structure for the guard 32 is generally designated 34 and comprises a clamp 36 to which is secured a pivot housing 38. Pivotally secured to the pivot housing is the arm 40 having a rounded frontal bumper 42 with a selectively extensible downward leg 44 to the lower end of which is secured the guard 32. The bumper is useful in the trimming mode as it occasionally engages high ground on the grassy area to be edged.

The mounting structure will now be described in greater detail. The clamp 36 comprises a pair of side plate (FIG. 7) 50 and 52. The plates each include side walls 54 and 56 respectively, integral bottom walls 58 and 60 respectively and a rearward wall 62 and 64 respectively. The bottom walls 58 and 60 are formed with matching semi-circular recesses 66 and 68 (not shown) formed with peripheral grooves 70, 72 (not shown) in the surfaces thereof. The side walls 54 and 56 are internally recessed as at 74 and 76 respectively and the side walls are further apertured as at 78 and 80 respectively. The opposing faces of the lower walls 58 and 60 are formed with bores 82 and 84, the former being tapped for reasons which will appear.

The rear walls 62 and 64 are formed with spaced openings 86 and 88. Stand-offs 90 and 92 are provided. The mounting unit further comprises a pair of half bushings 100 and 102 having ridges 104 and 106 in their outer surfaces respectively.

Adjustable clamp jaws 108 and 110 are provided and each comprise partial cylindrical walls 112, 114 having vertical aligned semi-circular recesses 116 and 118 respectively. The jaws have outer end walls 120 and 122 respectively and outward studs 124 and 126 respectively are formed on the end walls. Interfitting tongues 128 and grooves 130 are provided on the inner ends of the jaws.

Each jaw is provided with a pivotal rectangular plate 132, 134 apertured in their centers to receive respectively the studs 124 and 126. The plates 132 and 134 are adapted to ride adjustably in the rectangular elongate recesses 74 and 76.

Having described the structure, its assembly onto the shaft 12 will now be focused upon. It should be understood that the shafts 12 are of slightly different configuration from manufacturer to manufacturer and it is the purpose of the clamps 36 to accommodate the different size shafts and the different degrees of shaft curvature adjacent the head 16.

In assembly of the clamp 36 the split bushing 100, 102 is made to hug the bottom end of the shaft 12 as close to the head 16 as possible. The two plates 50, 52 with the jaws 108 and 110 in place in the respective sides, their plates 132 and 134 nesting respectively in the recesses 74 and 76, are brought together from either side of the shaft 12 (FIG. 3). The recesses 66 and 68 house the split bushing parts 100, 102 respectively. To avoid displacement of the bushing halves with respect to the clamps 52, the ridges 104, 106 are received into the grooves 70, 72.

Bolts (not shown in FIG. 7) are then extended into the openings 84 in side plate 52 and threadedly tightly engaged into the threaded bores 82 of the side plate 50.

As the plates 50 and 52 are brought together, the shaft 12 is received into the bushing 102, 104 and recesses 116, 118 of the clamping jaws 108, 110. As the plates are manually squeezed together, the jaws 108 and 110 shift along recesses 74 and 76 and rotate as necessary to accommodate the curvature of the shaft 12 above the bushing halves 100, 102.

The stand-offs 90 and 92 are aligned with the openings 78 and 80 and bolts, not shown, are extended from the outside through the respective openings 78 and 80 and screwed tightly into the threaded stand-offs 90 and 92 to close the clamp 36 firmly on the shaft 12. The rear wall comprising walls 62 and 64 are carefully oriented toward the rear of the shaft 12.

Because the recesses 74 and 76 are angled, the clamps 108 and 110 are given considerable freedom to shift fore and aft of the shaft as they move up or down of the recesses further enhancing the adaptability of the clamp 36 to different shaped shafts 12.

The pivot housing 38 comprises a pair of spaced decks 150 and 152 (FIG. 3). The decks are secured together by an intermediate web 154 and a mounting plate 156. The plate 156 may be bolted to the end walls 62, 64 of the clamp 36 to support the pivot housing 38 on the clamp 36.

Adjacent its distal end the two decks 150 and 152 are apertured in alignment to receive the bushings 158, 160. Upper bushing 158 is surrounded on the dec 150 by a curving fence 162 (FIG. 5), its two forward ends connected by a boss 164. The boss 164 is longitudinally drilled and receives a pin 166, the outer ends of which are pivotally secured in the side walls 168 of the flipper 170 having complementary shape to the curving fence 162 and embracing it as shown. The flipper includes a rearward lift tab 171 which may be formed to compliment the shape of the curving side walls 168 of the flipper.

When it is in engaged position, the flipper is down (hugging about the curving fence 162 FIG. 1, 4). When it is in disengaged position, the flipper is pivotted up (FIG. 8) about the pin 166. Any means, not shown, may be used to releasably hold the flipper up in disengaged position and optionally down in the engaged position as well.

The support arm 40 comprises an elongate flat plate, its forward end being curved into the frontal bumper 42. Adjacent its rearward end the plate has an eye block 182 having a central opening with a sleeve 184 (FIG. 6) secured therein. Bolts 186 extend through appropriate openings in the arm 40 and aligned openings in a plastic friction pad 188 and into tapped openings in the eye block 182 as shown in FIG. 6, securing the eye block 182 firmly to the arm 40. The pad must have a given thickness to serve as a rattle-free abutment for the arm against the flipper 170 in the normal or standby position. Hence the easy replaceability of the pad when it becomes worn is desirable.

A pin 190 (FIG. 3) having a pull ring 192 on the lower end thereof for easy extraction extends upward through the bushing 160 on the deck 152 through the sleeve 184 and the bushing 158 on the upper deck 150. A radially outward ball spring detent 194 is at the top end of the pin and holds the pin in the position shown until the ring 192 is pulled downwardly. The pin 190 serves to pivotally relate the pivot housing 38 and the arm 40.

It is to be noted that when the flipper is in engaged position, it will be abutted by the pad 188 on the inside of the arm 40 and that this abutment will block the rotation of the arm 40 about the pin irrespective of whether the arm happens to be in its normal position or in its standby position shown in dotted lines in FIGS. 5 and 6.

The top wall of the flipper 170 serves to strengthen the curving side walls 168 and also to protect the upper end of the pin 90 and hide it from view. Playing an important part also in the stiffening of the side walls 168 of the flipper is the curving fence 162 which backs up the side walls 168.

As shown in detail in FIG. 3, the front end of the arm has the bumper 42 which extends downward at the end of the arm in a vertical run. The run is apertured to receive an adjusting bolt 200 which extends through an elongated slot 202 in the extensible leg 44.

To the lower end of the leg is secured by a bolt 204 or the like arcuate guard 32. Thus the extension of the leg 44 below the bumper 42 may be controlled by tightening the bolt 200 when the leg is in the desired position along the slot 202. Also secured to the leg 44 may be a cutter 206 having cutting edge 206a and secured to a mounting area 208 to cut off the excess line 18 to the outside of the guard in the manner well known in the art. (As shown, a pair of spaced areas are provided alternately to mount the blade for alternate directions of rotation of the head or power source.)

From the structure so far described it will be clear that I have provided an effective guard for a vegetation cutter. The cutter may be used with the arcuate guard sliding flat along the ground to do trimming or the cutter may be tilted 90° so that the planar cutting circle C of the line is vertical and the front end of the cutter rides on the cutting guard (FIG. 2). Thereby the guard 32 becomes a support and guide much as the single wheel of a wheelbarrow is used to guide the advance of the wheelbarrow.

A number of advantages accrue from the structure described. In the trimming mode the guard keeps the line spaced away from objects to be trimmed around and thereby avoids damage and reduces cutting line wear. Because the guard establishes a plane parallel to the planar cutting circle, the cutting is stabilized and there are no wavy edges after trimming. Further, the trimmer may be set with its guard resting on the ground with the engine at full throttle and pushed or pulled along the ground as desir without scalping. These advantages accrue whether the guard is tubular or rectangular in cross-section. This is ideal for banked areas, under large shrubs and along sloping areas around tree trunks.

In the edging mode with the cutter tilted "on its ear" so that line 18 swings in a vertical circle, the front end of the trimmer is supported on the guard which rests on the ground and the guard serves as a guide as the cutter is pushed along the edge of a garden, for instance, to precisely edge the garden. Having the front end of the cutter supported on the ground saves the back muscles of the operator and makes possible extended edging periods without operator fatigue.

Figures 8, 9:
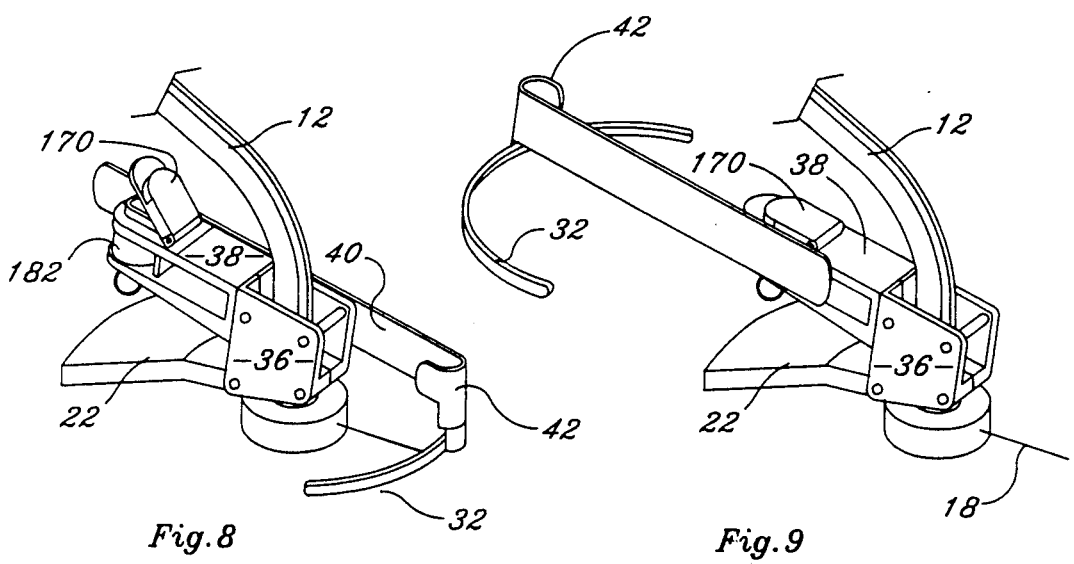
FIG. 8 is a view similar to FIG. 1 but showing the flipper in disengaged condition and the guard in normal condition.
FIG. 9 is similar to FIG. 8 but showing the guard pivoted back to standby position with the flipper in engaged position to lock the guard in place.

It should be clear that, if desired or necessary, the guard/guide 32 may be shifted from normal position to standby position by simply raising the flipper 170 and pivoting the arm 40 around the pin 190 180° to the rearward position shown (FIG. 9). Just as simply, the arm and guide can be removed altogether from the cutter by pulling downward on the ring 192 to remove pin 190 and sliding the eye block 182 laterally out of its position between the decks 150 and 152.

A further advantage is that the structure of the clamp 136 makes possible the mounting of the guard/guide on the shaft of trimmers of different manufacturers with different curvatures.

The invention has been shown in a single embodiment. It is, of course, envisioned that with a vegetation cutter having a straight shaft above the cutter head to a straight shaft from the power source, a much simpler clamping arrangement can be used in place of clamp 36. Also, simple clamping means can be used when the invention is applied to a non-hand-held cutter. Such structure need not be disclosed.

It is thus understood that many variations from the structure disclosed are possible and contemplated, and it is not intended that the invention be so limited but rather that it be defined by the broadest interpretation of the following claim language and that the right to exclude others from making, using or selling shall be extended to cover fair equivalents of the structure disclosed.

What is claimed is:

1. A vegetation cutter comprising:
   (a) a shaft with a power source at one end operatively connected at the other end to a rotating cutting device defining a planar cutting circle disposed about an axis at an obtuse angle with respect to a major portion of the shaft,
   (b) a guard and guide having an elongate arcuate shape, the arc centered on the axis with its radius substantially the same as that of the planar cutting circle and normally disposed in front of the planar cutting circle, the guard and guide having sufficient length in its normal position to operatively support and guide the cutting device when the cutter is turned and operated with the planar cutting circle in vertical disposition, and
   (c) mounting means secured to both the shaft and the guard and guide.

2. A vegetation cutter as claimed in claim 1 wherein the cutting device is a line trimmer.

3. A vegetation cutter as claimed in claim 2 wherein the mounting means provides a pivotal mounting for selectively supporting the guard and guide in its normal position or in a standby position pivoted out of the way to above the planar cutting circle.

4. A vegetation cutter as claimed in claim 1 wherein the mounting means clampingly engages the shaft in at least two spaced locations therealong.

5. A vegetation cutter as claimed in claim 4 wherein the mounting means comprises a split body having fixedly mounted therein a first split bushing for engagement with the shaft at one location and adjustably mounted therein a second split bushing for engaging the shaft at the second location and means for compressing the parts of the split body together to tighten the split bushings on the shaft, all to accommodate different shaped shafts.

6. A vegetation cutter as claimed in claim 5 wherein the split body has opposite side walls, the inside surfaces of which are grooved in alignment and the second split bushing carries ears adapted to fit respectively in the grooves to comprise the adjustable characteristic.

7. A vegetation cutter as claimed in claim 4 wherein the mounting means provides a pivotal mounting for selectively supporting the guard and guide in its normal position or in a standby position pivoted out of the way above the planar cutting circle.

8. A vegetation cutter as claimed in claim 7 wherein the pivotal mounting means comprises a body clamped on the shaft and having a pair of aligned journals and an arm secured to the guard and guide and having an eye which is aligned between the journals and a pin extending through the journals and eye to pivotally relate the body and arm.

9. A vegetation cutter as claimed in claim 8 having a blocking finger pivoted to the body adjacent the journals and adapted when disengaged to permit free pivoting of the arm from normal to stand-by position and when engaged to engage the arm to block pivoting of the arm from the normal or the stand-by position.

10. A vegetation cutter as claimed in claim 1 wherein the guard and guide are symetrically disposed in the front of the cutter and extend for at least 150° with respect to the axis.

11. A vegetation cutter comprising:
(a) a structure including a power source and a rotating cutting element driven by the source and defining a planar cutting circle having an axis, the structure adapted to be manipulated by an operator located behind the cutting element,
(b) a rigid guard and guide on the opposite side of the element from the operator and having a smooth and continuous elongate arcuate shape and normally disposed at a point directly in front of the cutting circle and extending back in opposite lateral directions from the point partly around the respective sides of the circle, the arc centered on the axis with radius substantially the same as that of the planar cutting circle, the guard and guide having sufficient length in its normal position to operatively support and guide the cutting device when the cutter is turned and operated with the planar cutting circle in vertical disposition, and
(c) mounting means secured to both the structure and the guard and guide.

12. A vegetation cutter as claimed in claim 11 wherein the mounting means provides a pivotal mounting for selectively supporting the guard and guide in its normal position or in a stand-by position pivoted out of the way to behind the axis and above the planar cutting circle.

13. A vegetation cutter as claimed in claim 12 wherein the pivotal mounting means comprises a body clamped on the structure and having a pair of aligned journals and an arm secured to the guard and guide and having an eye which is aligned between the journals and a pin extending through the journals and eye to pivotally relate the body and arm.

14. A vegetation cutter as claimed in claim 13 having a blocking finger pivoted to the body adjacent the journals and adapted when disengaged to permit free pivoting of the arm from normal to stand-by position and when engaged to engage the arm to block pivoting of the arm from the normal or the stand-by position.

15. A vegetation cutting comprising:
(a) a structure including a power source and a rotating cutting element driven by the source defining a planar cutting cirlce having an axis,
(b) a guard having a narrow elongate arcuate shape, the arc centered on the axis with radius substantially the same as that of the planar cutting circle and disposed in front and beneath the planar cutting circle, the arc extending for approximately 150° and the height of the guard being no greater than ½ and the thickness being no greater than ¼, and
(c) mounting means secured to both the structure and the guard.

16. A vegetation cutter as claimed in claim 15 wherein the mounting means provides a pivotal mounting for selectively supporting the guard in its normal position or in a standby position pivoted out of the way behind and above the planar cutting circle.

17. A vegetation cutter as claimed in claim 16 wherein the pivotal mounting means comprises a body clamped on the structure and having a pair of aligned journals and an arm secured to the guard and having an eye which is aligned between the journals and a pin extending through the journals and eye to pivotally relate the body and arm.

18. A vegetation cutter as claimed in claim 17 having a blocking finger pivoted to the body adjacent the journals and adapted when disengaged to permit free pivoting of the arm from normal to stand-by position and when engaged to engage the arm to block pivoting of the arm from the normal or the stand-by position.

19. A vegetation cutter as claimed in claim 1 wherein the guard and guide is entirely below the planar cutting circle.

20. A vegetation cutter as claimed in claim 11 wherein the guard and guide is entirely below the planar cutting circle.

21. A vegetation cutter as claimed in claim 15 wherein the guard and guide is entirely below the planar cutting circle.

* * * * *